(12) United States Patent
Aizu et al.

(10) Patent No.: US 11,561,665 B2
(45) Date of Patent: Jan. 24, 2023

(54) DISPLAY METHOD, RECORDING MEDIUM, AND DISPLAY SYSTEM

(71) Applicant: Panasonic Intellectual Property Management Co., Ltd., Osaka (JP)

(72) Inventors: Kazuhiro Aizu, Osaka (JP); Jasmeen Julayhi, Osaka (JP); Minoru Satou, Hyogo (JP); Rikiya Masuda, Osaka (JP); Masami Ohno, Osaka (JP); Tomikazu Imai, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 16/606,715

(22) PCT Filed: Apr. 5, 2018

(86) PCT No.: PCT/JP2018/014511
§ 371 (c)(1),
(2) Date: Oct. 18, 2019

(87) PCT Pub. No.: WO2018/193856
PCT Pub. Date: Oct. 25, 2018

(65) Prior Publication Data
US 2020/0064974 A1    Feb. 27, 2020

(30) Foreign Application Priority Data
Apr. 21, 2017 (JP) .............................. JP2017-084745

(51) Int. Cl.
*G06F 3/0481* (2022.01)
*G06F 3/14* (2006.01)
*G09G 5/00* (2006.01)

(52) U.S. Cl.
CPC .......... *G06F 3/0481* (2013.01); *G06F 3/1446* (2013.01); *G09G 5/003* (2013.01)

(58) Field of Classification Search
CPC ...... G06F 3/0481; G06F 3/1446; G09G 5/003
See application file for complete search history.

(56) References Cited

U.S. PATENT DOCUMENTS

| 5,579,221 A | 11/1996 | Mun | |
|---|---|---|---|
| 6,563,430 B1 * | 5/2003 | Kemink | H04B 1/202 340/12.22 |

(Continued)

FOREIGN PATENT DOCUMENTS

| CN | 104298454 A | 1/2015 |
|---|---|---|
| CN | 105116783 A | 12/2015 |

(Continued)

OTHER PUBLICATIONS

English Translation of Korean Publication KR20150043658 (Year: 2015).*

(Continued)

*Primary Examiner* — Patrick N Edouard
*Assistant Examiner* — Eboni N Giles
(74) *Attorney, Agent, or Firm* — McDermott Will & Emery LLP

(57) ABSTRACT

A display method includes: based on at least one of first information obtained by a control device including a display and second information obtained by a device other than the control device, changing an image used as a basic screen that is displayed on the display and is for controlling a control target device other than the control device by a user (S12).

15 Claims, 11 Drawing Sheets

(56) References Cited

U.S. PATENT DOCUMENTS

| | | | |
|---|---|---|---|
| 7,139,562 | B2 | 11/2006 | Matsui |
| 9,467,848 | B1 | 10/2016 | Song et al. |
| 9,489,062 | B2 | 11/2016 | Corcoran et al. |
| 9,658,738 | B1* | 5/2017 | Park ................. G06F 3/0481 |
| 10,161,833 | B2 | 12/2018 | Hughes et al. |
| 10,187,514 | B2* | 1/2019 | Hong ............ G06F 3/04817 |
| 2005/0128194 | A1 | 6/2005 | Wada |
| 2006/0031460 | A1 | 2/2006 | Araki et al. |
| 2007/0146160 | A1* | 6/2007 | Takeshita ........... G08C 23/04 340/13.24 |
| 2007/0223048 | A1 | 9/2007 | Misawa et al. |
| 2009/0237371 | A1 | 9/2009 | Kim et al. |
| 2009/0299504 | A1 | 12/2009 | Kumazawa et al. |
| 2011/0167363 | A1 | 7/2011 | Kinoshita |
| 2012/0130513 | A1* | 5/2012 | Hao ..................... G05B 15/02 700/90 |
| 2013/0097533 | A1 | 4/2013 | Hong et al. |
| 2013/0139089 | A1 | 5/2013 | Cho et al. |
| 2014/0298253 | A1 | 10/2014 | Jin et al. |
| 2014/0313229 | A1 | 10/2014 | Arita et al. |
| 2015/0039100 | A1 | 2/2015 | Yoshida et al. |
| 2015/0105917 | A1 | 4/2015 | Sasaki et al. |
| 2016/0116292 | A1 | 4/2016 | An et al. |
| 2016/0156957 | A1 | 6/2016 | Yun |
| 2017/0278477 | A1 | 9/2017 | Jeong et al. |
| 2017/0330160 | A1 | 11/2017 | Sueyoshi et al. |
| 2018/0018084 | A1* | 1/2018 | Kim ..................... G06F 3/0488 |
| 2018/0268163 | A1* | 9/2018 | Ollikainen ......... G06F 21/6245 |
| 2020/0125220 | A1 | 4/2020 | Aizu et al. |

FOREIGN PATENT DOCUMENTS

| | | |
|---|---|---|
| CN | 106549833 A | 3/2017 |
| JP | 2004-183971 A | 7/2004 |
| JP | 2005-17167 A | 1/2005 |
| JP | 2005-176018 A | 6/2005 |
| JP | 2005-221345 A | 8/2005 |
| JP | 2007-114888 A | 5/2007 |
| JP | 2007-116270 A | 5/2007 |
| JP | 2007-181068 A | 7/2007 |
| JP | 2007-259329 A | 10/2007 |
| JP | 2008-273126 A | 11/2008 |
| JP | 2010-041344 A | 2/2010 |
| JP | 2010-109789 A | 5/2010 |
| JP | 2013-165342 A | 8/2013 |
| JP | 2013-232961 A | 11/2013 |
| JP | 2015-506133 A | 2/2015 |
| JP | 2015-050752 A | 3/2015 |
| JP | 2015-099007 A | 5/2015 |
| JP | 2015-201056 A | 11/2015 |
| KR | 20150043658 * | 4/2015 ......... G06F 3/04817 |
| WO | 00/17737 A1 | 3/2000 |
| WO | 2006/072870 A1 | 7/2006 |
| WO | WO-2010018082 A1 * | 2/2010 ........... G06F 3/0482 |
| WO | 2010/024357 A1 | 3/2010 |
| WO | 2013/081303 A1 | 6/2013 |
| WO | 2014/103309 A1 | 7/2014 |

OTHER PUBLICATIONS

English Translation of WO 2010018082 (Year: 2010).*
Extended European Search Report issued in corresponding European Patent Application No. 18787421.9, dated Feb. 18, 2020.
International Search Report issued in PCT/JP2018/014511, dated Jun. 19, 2018, with English translation.
Office Action dated Dec. 31, 2020 issued in corresponding U.S. Appl. No. 16/605,486.
Non-Final Office Action issued in U.S. Appl. No. 16/605,486, dated Jun. 23, 2020.
Extended European Search Report dated Mar. 17, 2020 issued in corresponding European Patent Application No. 18787774.1.
International Search Report and Written Opinion dated May 22, 2018 in International Application No. PCT/JP2018/014509; with partial English translation.
Advisory Action issued in U.S. Appl. No. 16/605,486, dated Mar. 9, 2021.
Final Office Action dated Nov. 12, 2021 issued in the related U.S. Appl. No. 16/605,486.
Chinese Office Action with the Search Report dated Jul. 1, 2022 issued in the corresponding Chinese Patent Application No. 201880026125.8, with English translation of the Search Report.

* cited by examiner

<INITIAL STATE>

<AFTER CHANGE>

DISPLAY METHOD, RECORDING MEDIUM, AND DISPLAY SYSTEM

CROSS-REFERENCE OF RELATED APPLICATIONS

This application is the U.S. National Phase under 35 U.S.C. § 371 of International Patent Application No. PCT/JP2018/014511, filed on Apr. 5, 2018, which in turn claims the benefit of Japanese Application No. 2017-084745, filed on Apr. 21, 2017, the entire disclosures of which Applications are incorporated by reference herein.

TECHNICAL FIELD

The present invention relates to a display method, a recording medium, and a display system of a screen for controlling a device.

BACKGROUND ART

Conventionally, the technology of improving the operability of a mobile terminal such as a smart phone is known. PTL 1 discloses a cellular phone that displays, on a display, an operation panel and operation buttons corresponding to an application program predicted to be used according to the time and place.

CITATION LIST

Patent Literature

PTL 1: Japanese Unexamined Patent Application Publication No. 2010-109789

SUMMARY OF THE INVENTION

Technical Problem

Incidentally, even in an information terminal operated by a user to control a device, improving the operability is an issue to be addressed.

The present invention provides a display method, a recording medium, and a display system that can reduce the number of times of operation for a user to control a device.

Solutions to Problems

A display method according to an aspect of the present invention includes: based on at least one of first information obtained by an information terminal including a display and second information obtained by a device other than the information terminal, changing an image used as a basic screen that is displayed on the display and is for controlling a control target device other than the information terminal by a user.

A recording medium according to an aspect of the present invention is a non-transitory computer-readable recording medium having recorded thereon a program for causing a computer to execute the above-described display method.

A display system according to an aspect of the present invention includes: an information terminal including a display; and a display controller that, based on at least one of first information obtained by the information terminal and second information obtained by a device other than the information terminal, changes an image used as a basic screen that is displayed on the display and is for controlling a control target device other than the information terminal by a user.

Advantageous Effect of Invention

The present invention realizes a display method, a recording medium, and a display system that can reduce the number of times of operation for a user to control a device.

DESCRIPTION OF EXEMPLARY EMBODIMENTS

Hereinafter, embodiments will be described with reference to the drawings. It should be noted that each of the following embodiments shows a generic or specific example. The numerical values, shapes, materials, elements, the arrangement and connection of the elements, steps, the processing order of the steps, etc. shown in the following embodiments are mere examples, and thus are not intended to limit the present disclosure. Furthermore, among the elements described in the following embodiments, elements not recited in any one of the independent claims that indicate the broadest concepts are described as optional elements.

It should be noted that each of the figures is a schematic diagram and thus is not necessarily a precise illustration. Furthermore, in the figures, elements that are substantially the same are given the same numerical references, and overlapping description thereof may be omitted or simplified.

Embodiment 1

[Configuration of Device Control System]

Figure 1:
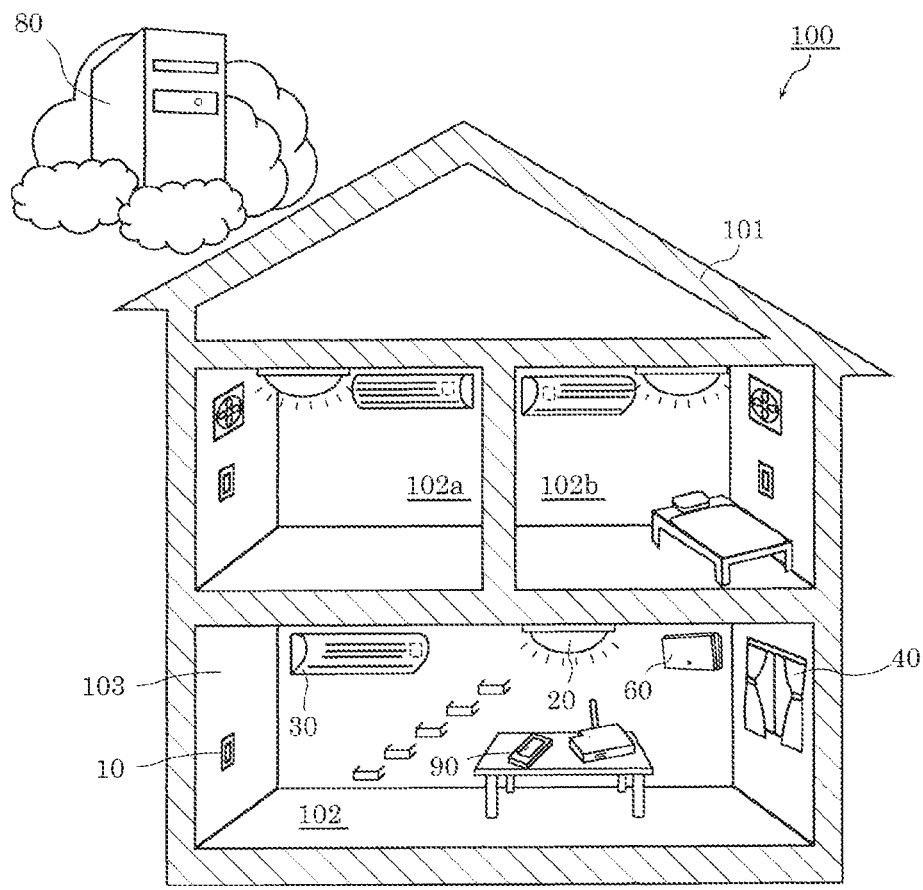
FIG. 1 is a diagram showing the outline of a device control system according to Embodiment 1.

First, the configuration of a device control system according to Embodiment 1 will be described. FIG. 1 is a diagram showing the outline of the device control system according to Embodiment 1.

As shown in FIG. 1, device control system 100 is a system that is provided in facility 101, and that is for controlling a device disposed in facility 101. Facility 101 is, for example, a detached house. A plurality of rooms divided with walls, doors, etc. are included in facility 101. Specifically, the plurality of rooms are room 102, room 102a, and room 102b.

Figure 2:
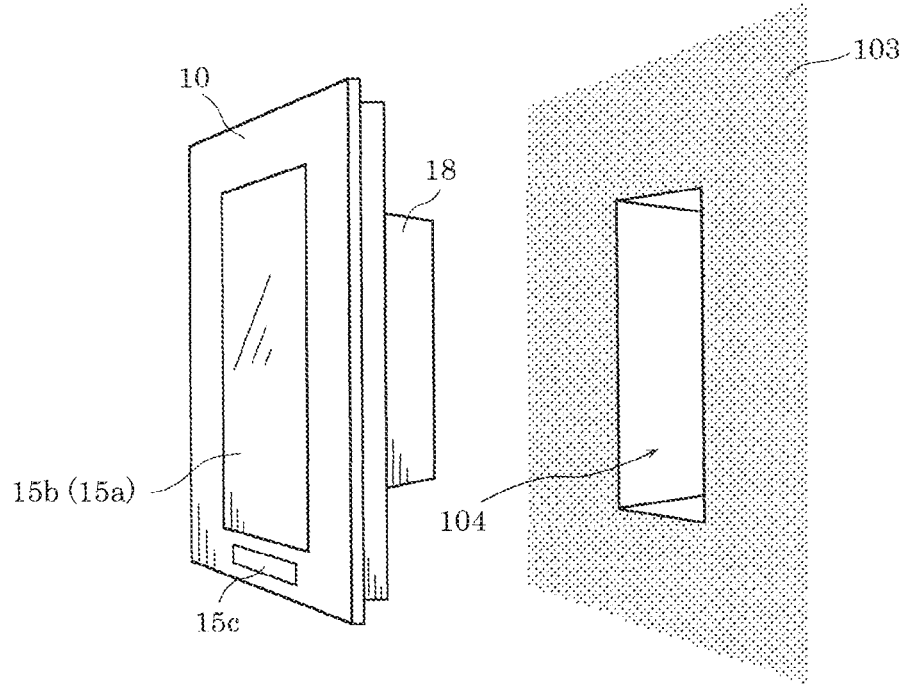
FIG. 2 is a perspective view of a control device according to Embodiment 1.
Figure 3:
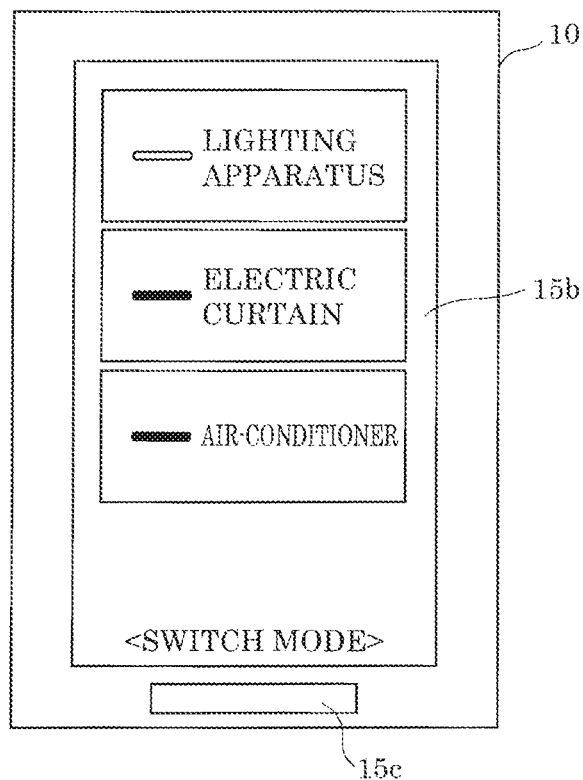
FIG. 3 is a front view of the control device according to Embodiment 1.

Control device 10 included in device control system 100 is a controller for a user to control lighting apparatus 20, air-conditioner 30, and electric curtain 40 that are disposed in room 102. Control device 10 also functions as a so-called wall switch (wall switch apparatus). FIG. 2 is a perspective view of control device 10. FIG. 3 is a front view of control device 10.

As shown in FIG. 2, control device 10 is disposed on wall 103 of room 102. Wall 103 is an example of structures included in facility 101. Control device 10 is disposed on wall 103 in a state where at least a part of housing 18 is housed in switch box 104 embedded in wall 103. A mounting method of control device 10 is broadly similar to that of a general-purpose wall switch, and a switch box for a wall switch can also be used for switch box 104.

As shown in FIG. 3, control device 10 functions as a so-called GUI (Graphical User Interface), and images including, for example, icons (buttons) are displayed on display 15b of control device 10. The images are displayed on the entire display area of display 15b, and the icons are displayed on a part of the display area of display 15b. The user can turn on and off the electric power supply to each device, i.e., lighting apparatus 20, air-conditioner 30, and electric curtain 40 by performing a tap operation on the parts of the icons on display 15b (touch panel).

Figure 4:
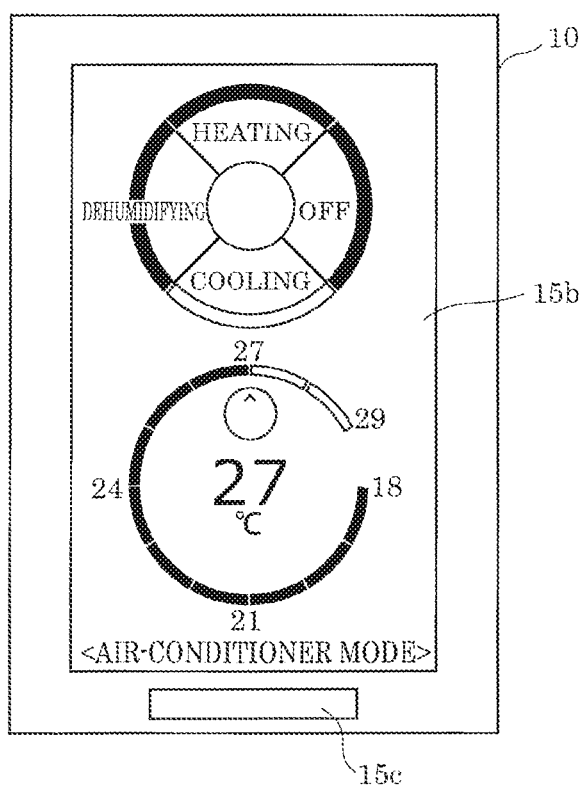
FIG. 4 is a diagram showing an example of an image for controlling an air-conditioner.

Further, an image for performing detailed control of each above-described device is also displayed on display 15b of control device 10. FIG. 4 is a diagram showing an example of the image for controlling air-conditioner 30. With the image shown in FIG. 4, it is possible for the user to perform changing of the operation mode and set temperature of air-conditioner 30. The changing of the operation mode and set temperature of air-conditioner 30 may be performed via respectively different images. Further, although not shown, an exclusive image for performing the dimming control and toning control, etc. of lighting apparatus 20, and an exclusive image for opening and closing electric curtain 40 may be displayed on display 15b.

Only one of such image for controlling air-conditioner 30, image for controlling lighting apparatus 20, and image for controlling electric curtain 40 is selectively displayed on display 15b, for example. For example, whenever the user performs a swipe operation on display 15b (touch panel), the image currently displayed is switched to another image.

Figure 5:
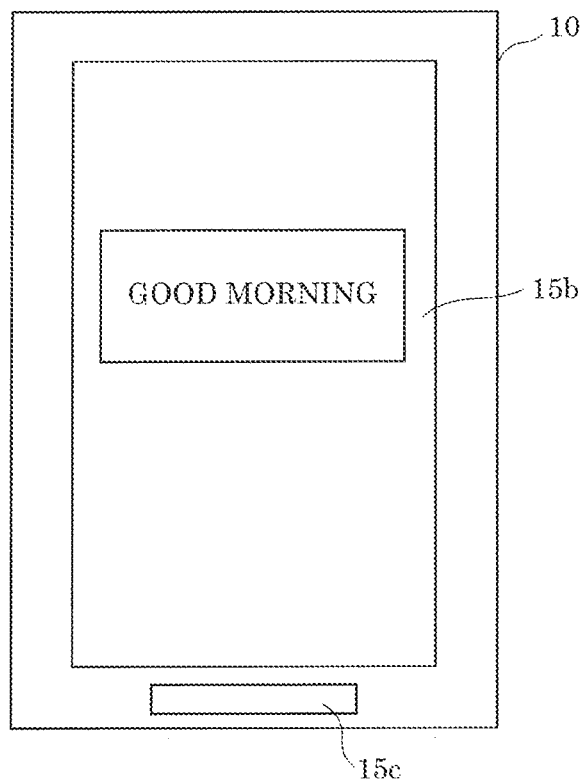
FIG. 5 is a diagram showing an example of an image for scene control.
Figure 6:
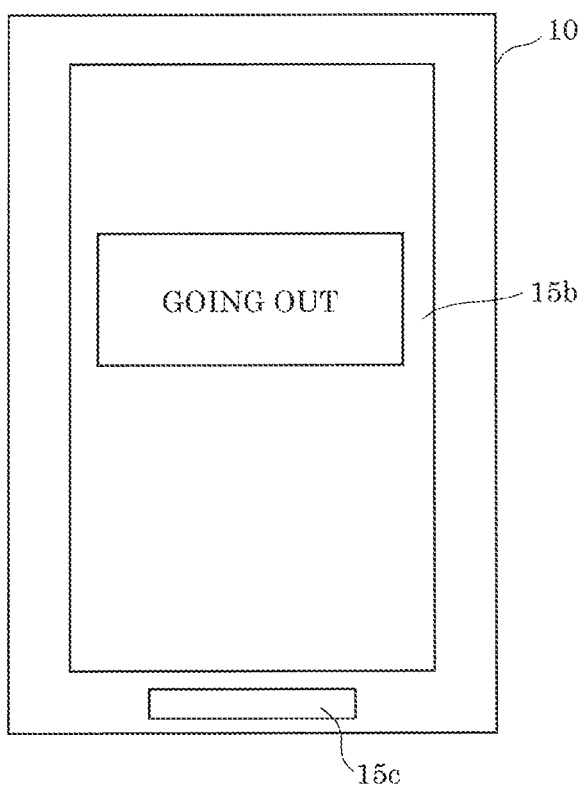
FIG. 6 is a diagram showing another example of an image for scene control.

Additionally, an image for scene control is also displayed on display 15b of control device 10. FIG. 5 and FIG. 6 are diagrams showing examples of the image for scene control.

The scene control is control that operates at least a part of a plurality of devices disposed in facility 101, in order to approximate the inside of facility 101 to a predetermined indoor environment. In the scene control, for example, a plurality of devices with different functions are collectively controlled. For example, as shown in FIG. 5, an image including an icon including the characters of "good morning" (hereinafter also described as a good morning icon) is an image for the scene control performed mainly when the user wakes up. When a tap operation is performed on the good morning icon, lighting apparatus 20 is turned on, electric curtain 40 is opened, and air-conditioner 30 is turned on by transmitting a control signal by control device 10. That is, the control suitable for when the user wakes up is performed by one-touch.

Additionally, as shown in FIG. 6, an image including an icon including the characters of "going out" (hereinafter also described as an going out icon) is an image for the scene control performed mainly when the user goes out. When a tap operation is performed on the going out icon, lighting apparatus 20 is turned off, electric curtain 40 is closed, and air-conditioner 30 is turned off by transmitting a control signal by control device 10. That is, the control suitable for when the user goes out is performed by one-touch.

Only one of such images for scene control is selectively displayed on display 15b of control device 10. For example, whenever the user performs a swipe operation on display 15b (touch panel 15a), the image for scene control currently displayed is switched to another image for scene control.

Here, control device 10 (device control system 100) can automatically change an image (for example, a still image) used as a basic screen. The basic screen is a screen that is displayed on display 15b, and that is for controlling control target devices other than control device 10 by the user.

Specifically, the basic screen is a screen that is displayed on display 15b, when display 15b of control device 10 has not been operated for a predetermined period, or when display 15b of control device 10 is operated after not having been operated for a predetermined period. More specifically, the basic screen is a screen displayed first, for example, after display 15 is operated while a black image is displayed.

Additionally, the basic screen may be a screen for operation (a screen capable of accepting operations by the user) first displayed on display 15b when a reset operation is performed on control device 10. The reset operation includes an operation of turning on the power supply of control device 10, etc. The basic screen is an image including at least one icon that is a target of operation, and screens such as those that include the logo mark of a manufacturing maker, and which are not the target of operation are not included in the basic screen.

Figure 7:
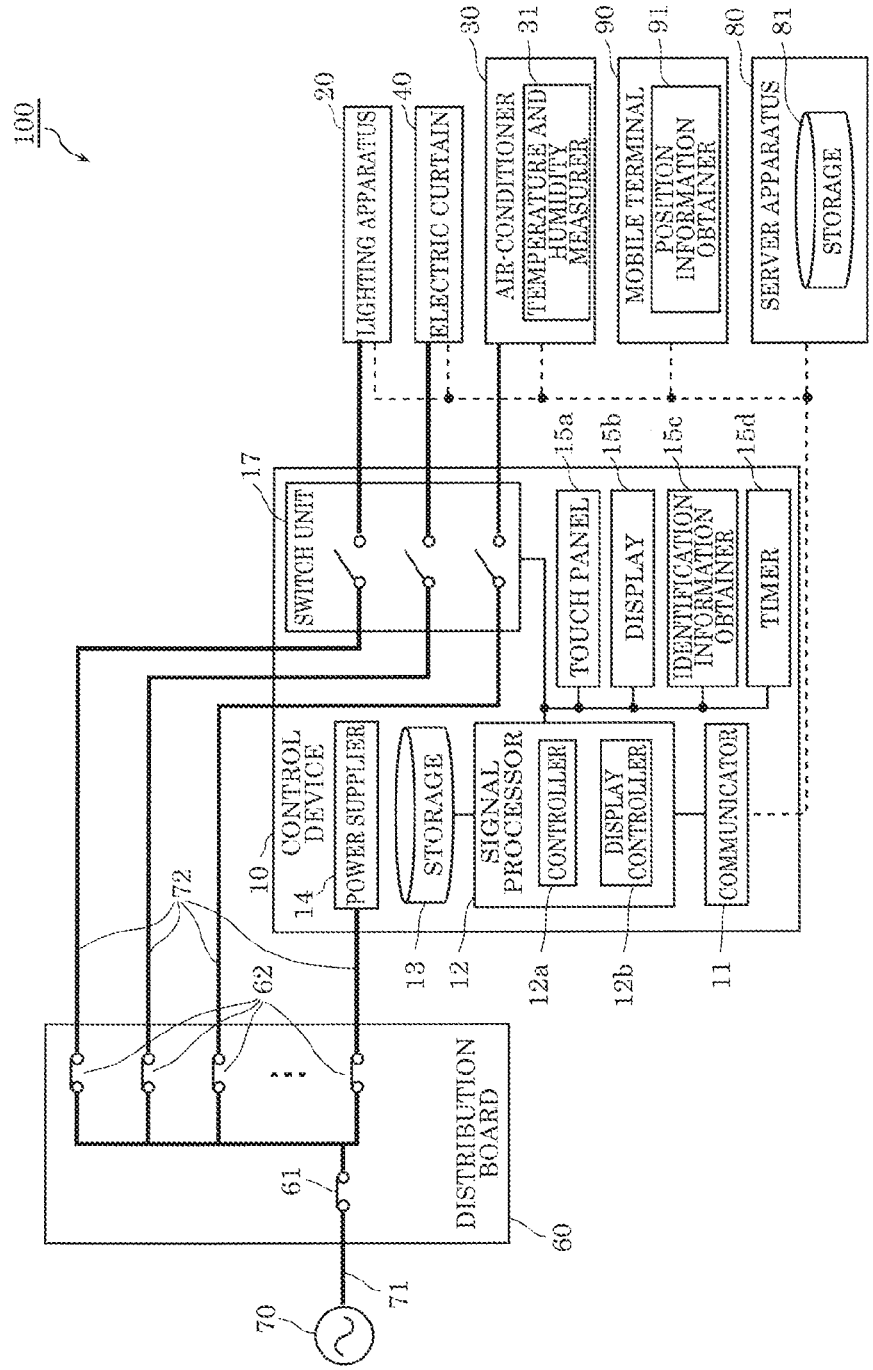
FIG. 7 is a block diagram showing a configuration of a device control system according to Embodiment 1.

Hereinafter, the detailed configuration of device control system 100 will be described. FIG. 7 is a block diagram showing the configuration of a device control system according to Embodiment 1.

Device control system 100 is an example of a display system. As shown in FIG. 7, specifically, device control system 100 includes control device 10, lighting apparatus 20, air-conditioner 30, electric curtain 40, distribution board 60, server apparatus 80, and mobile terminal 90. Additionally, electric power system 70, which is an external power supply, is also shown in FIG. 7. Hereinafter, referring mainly to FIG. 1 and FIG. 7, each component constituting device control system 100 will be described.

[Control Device]

As described above, control device 10 is a controller that is disposed in, for example, room 102, and that is for controlling the device disposed in room 102 by the user. Control device 10 is an example of an information terminal. Specifically, control device 10 controls lighting apparatus 20, air-conditioner 30, and electric curtain 40. In other words, lighting apparatus 20, air-conditioner 30, and electric curtain 40 are examples of a control target device of control device 10.

Specifically, control device 10 includes communicator 11, signal processor 12, storage 13, power supplier 14, touch panel 15a, display 15b, identification information obtainer 15c, timer 15d, and switch unit 17. Additionally, as shown in FIG. 2, control device 10 includes housing 18.

Communicator 11 performs wireless communication with the device disposed in facility 101. Specifically, communicator 11 wirelessly transmits the control signal to lighting apparatus 20, air-conditioner 30, and electric curtain 40 based on control by signal processor 12 (controller 12a). Additionally, communicator 11 can also communicate with a device located outside facility 101, such as server apparatus 80 or mobile terminal 90 (shown in facility 101 in FIG. 1), via a wide area network such as the Internet. Communicator 11 receives, for example, a variety of information from server apparatus 80 or mobile terminal 90.

Specifically, communicator 11 is realized by a communication module (communication circuit). Communicator 11 is realized by, for example, a plurality of communication modules, such as a communication module for performing wireless communication with the device disposed in facility 101, and a communication module for performing communication with the device located outside facility 101 via a wide area network.

Signal processor 12 performs signal processing relevant to control of the device. Signal processor 12 includes controller 12a, and display controller 12b. Specifically, signal processor 12 is realized by a processor, a microcomputer, or a dedicated circuit. The specific operation of signal processor 12 will be described later.

Controller 12a performs control of lighting apparatus 20, air-conditioner 30, and electric curtain 40 by causing communicator 11 to wirelessly transmit the control signal. That is, the expressions "control" and "perform control" include outputting a control signal, etc. Additionally, controller 12a controls switch unit 17 based on the operation to display 15b (touch panel 15a). That is, controller 12a controls turning on and off of electric power supply to lighting apparatus 20, air-conditioner 30, and electric curtain 40.

Display controller 12b displays the above-described image for the scene control, etc. on display 15b. Specifically, display controller 12b displays the image on display 15b by generating a video signal, and outputting the generated video signal to display 15b. Additionally, display controller 12b changes the image of the basic screen that is displayed on display 15b included in control device 10, and that is used as the basic screen for controlling the object devices other than control device 10 by the user. The details of such a changing operation of the basic screen are will be described later.

The information that is the origin of an image displayed on display 15b (information that is the origin of a video signal), a control program executed by signal processor 12, etc. are stored in storage 13. Specifically, storage 13 is realized by a semiconductor memory, etc.

Power supplier 14 includes a power receiver (for example, a terminal for power receiving) that receives AC power supplied from electric power system 70, and converts the AC power received by the power receiver into DC power suitable for the operation of control device 10, and supplies the DC power to each component included in control device 10. The AC power received by the power receiver is, for example, the AC power for an existing wall switch (power switch for the device disposed in facility 101). Specifically, power supplier 14 is a power supply circuit including an AC/DC converter, or a DC/DC converter.

Touch panel 15a is a detection device that detects an operation of the user to display 15b (touch panel 15a). Touch panel 15a may be a capacitive touch panel, or may be a touch panel of other systems, such as a resistive film system.

Display 15b is a touch-panel display on which touch panel 15a is disposed. Display 15b displays an image for the scene control, etc. based on control by display controller 12b. The images displayed by display 15b are illustrated in the above-described FIG. 3 to FIG. 6. Specifically, display 15b is realized by a liquid crystal panel or an organic EL panel, etc.

Identification information obtainer 15c obtains the identification information of the user who is operating control device 10. Specifically, identification information obtainer 15c is a fingerprint sensor, and obtains the user's fingerprint information as the user's identification information. Identification information obtainer 15c may be a biometric sensor that obtains the other biometric information, such as a sensor that detects a vein pattern. Additionally, identification information obtainer 15c may be an imaging apparatus that obtains the image of the user's face as the identification information. In this case, the user is identified by image processing including facial recognition processing.

Timer 15d is a timing apparatus that measures the present date and time (including the year, month, and day). Although timer 15d is specifically a real-time clock (RTC), etc., timer 15d may be any form.

Switch unit 17 turns on and off the electric power supply from electric power system 70 to each of lighting apparatus 20, air-conditioner 30, and electric curtain 40 based on the operation to display 15b (touch panel 15a). That is, switch unit 17 turns on and off the main power supply of lighting apparatus 20, air-conditioner 30, and electric curtain 40. Specifically, switch unit 17 is controlled by controller 12a based on the operation to display 15b (touch panel 15a). Switch unit 17 includes three switch elements corresponding to lighting apparatus 20, air-conditioner 30, and electric curtain 40 for direct control without performing wireless communication by controller 12a.

The switch elements are located on branch circuits 72 (on power lines) from electric power system 70 to each device, i.e., lighting apparatus 20, air-conditioner 30, and electric curtain 40, and turn on and off the electric connection between electric power system 70 and each device. In other words, the switch elements switch whether or not to supply power to the device disposed in facility 101. The switch elements may be elements that structurally open and close electric contacts, such as relay elements, or may be semiconductor switching elements, such as power transistors. Note that switch unit 17 may include at least one switch element. That is, switch unit 17 may be able to directly turn on and off the electric power supply to at least one device.

Housing 18 (shown in FIG. 2) houses communicator 11, signal processor 12 (controller 12a and display controller 12b), touch panel 15a, display 15b, identification information obtainer 15c, timer 15d, and switch unit 17. Although housing 18 is formed of, for example, a resin, a part or all of housing 18 may be formed of a metal. As described above, at least a part of housing 18 is embedded in wall 103 of facility 101. Housing 18 may be directly attached to the wall of facility 101, or may be indirectly attached to the wall of facility 101 via an attaching member, etc. Housing 18 may be able to be attached to a structure, such as wall 103 of facility 101.

In the above, the configuration of control device 10 has been described. Note that the described configuration of control device 10 is an example. For example, control device 10 may be a controller that does not include the components (switch unit 17, etc.) for functioning as a wall switch.

[Lighting Apparatus]

Lighting apparatus 20 is an example of the device disposed in facility 101, and is specifically disposed in room 102. Lighting apparatus 20 is a so-called ceiling light that lights the inside of a room. Specific forms of lighting apparatus 20 may be, but not particularly limited to, a downlight, a pendant light, a spotlight, or a bracket light, etc.

Specifically, lighting apparatus 20 includes an LED (Light Emitting Diode) as a light source. Lighting apparatus 20 may include a semiconductor light-emitting element such as a fluorescence tube, and a semiconductor laser, or a solid light-emitting element such as an organic EL (Electro Luminescence), and an inorganic EL, as a light source.

Additionally, although not shown, lighting apparatus 20 includes a communication module (communication circuit) for performing wireless communication with control device 10, and receives the control signal transmitted by communicator 11 included in control device 10. That is, lighting apparatus 20 can emit light or turn off the light based on the control signal received from control device 10. For example, when the rate of dimming (dimming ratio) is specified in the control signal, lighting apparatus 20 emits light at the specified rate of dimming. Additionally, when the color temperature is specified in the control signal, lighting apparatus 20 emits light with the specified color temperature. Further, the turning on and off (lighting and turning off the lights) of the electric power supply from electric power system 70 to lighting apparatus 20 are controlled by switch unit 17.

[Air-Conditioner]

Air-conditioner 30 is an example of the device disposed in facility 101, and is specifically disposed in room 102. Air-conditioner 30 is a home use air-conditioner. Air-conditioner 30 is an air-conditioner that can adjust the temperature of the wind sent out from air-conditioner 30 by including a heat exchanger (not shown), etc. That is, air-conditioner 30 includes a blowing function, and cooling and heating functions. Air-conditioner 30 is not limited to the home use air-conditioner, and may be an industrial air-conditioner.

Air-conditioner 30 includes temperature and humidity measurer 31. Temperature and humidity measurer 31 measures the temperature and humidity of room 102, and outputs the temperature information indicating the measured temperature (room temperature), and the humidity information indicating the measured humidity. Temperature and humidity measurer 31 includes a thermistor or a thermocouple as an element for measuring the temperature, and includes a polymer resistance humidity sensor, or a polymer capacitance humidity sensor as an element for measuring the humidity. Note that temperature and humidity measurer 31 separated from air-conditioner 30 may be used for measurement of the temperature and humidity in facility 101. Additionally, a temperature measurer separated from air-conditioner 30 and a humidity measurer separated from air-conditioner 30 may be used for measurement of the temperature and humidity in facility 101.

Additionally, although not shown, air-conditioner 30 includes a communication module (communication circuit) for performing wireless communication with control device 10, and receives the control signal transmitted by communicator 11 included in control device 10. That is, air-conditioner 30 can perform switching of operation mode, and changing of set temperature based on the control signal received from control device 10. Additionally, air-conditioner 30 transmits the temperature information and the humidity information that are output by temperature and humidity measurer 31 to communicator 11 included in control device 10. Turning on and off of the electric power supply from electric power system 70 to air-conditioner 30 are controlled by switch unit 17.

[Electric Curtain]

Electric curtain 40 is an example of the device disposed in facility 101, is disposed in room 102, and opens and closes a curtain. Although not shown, electric curtain 40 includes a communication module (communication circuit) for performing wireless communication with control device 10, and receives the control signal transmitted by communicator 11 included in control device 10. That is, electric curtain 40 opens and closes the curtain based on the control signal received from control device 10. Turning on and off of the electric power supply from electric power system 70 to electric curtain 40 are controlled by switch unit 17.

[Distribution Board]

Distribution board 60 includes main breaker 61 for turning on or off the electric power supply from electric power system 70 through main line 71. Main breaker 61 is a breaker that stops supply of the electric power from electric power system 70, when a current exceeding a predetermined current (a current based on the electric power defined by a contract with an electric power company) flows from electric power system 70.

Additionally, distribution board 60 includes a plurality of branch breakers 62 corresponding to a plurality of branch circuits 72 branched from main line 71, respectively. That is, distribution board 60 includes branch breaker 62 for each of branch circuits 72. Branch breaker 62 is a breaker which, when an overcurrent flows into branch circuit 72 connected to branch breaker 62, stops the supply of electric power to branch circuit 72.

Further, distribution board 60 may include a power consumption measuring function, and a wireless communication function that transmits measured power consumption. The power consumption measuring function in this case may be a function that measures only the power consumption in main line 71, or may be a function that measures both the power consumption in main line 71, and the power consumption for each of branch circuits 72. Additionally, device control system 100 may include a power consumption measuring apparatus separated from distribution board 60. The separated power consumption measuring apparatus may measure only the power consumption in main line 71, or may measure both the power consumption in main line 71 and the power consumption for each of branch circuits 72.

[Server Apparatus]

Server apparatus 80 is an apparatus that obtains and manages information. Server apparatus 80 obtains, for example, weather forecast information, schedule information, traffic jam information, or delay information of public transportation facilities, and manages the obtained information. Server apparatus 80 includes storage 81 for managing (storing) such information. Storage 81 is realized by an HDD (Hard Disk Drive), or a semiconductor memory, etc.

Additionally, although not shown, server apparatus 80 includes a communication module (communication circuit) for communicating with control device 10, and transmits the information stored in storage 81 to communicator 11 included in control device 10.

Further, server apparatus 80 may be a server apparatus that constitutes a client/server system with control device 10.

[Mobile Terminal]

Mobile terminal 90 is an information communication terminal carried by the user, and, specifically, is a smart phone, a tablet terminal, or a wearable terminal. The wearable terminal includes a glasses type terminal, a bracelet type terminal, and a wristwatch type terminal, etc. Mobile terminal 90 includes position information obtainer 91 that obtains the position information indicating the current position of mobile terminal 90. Specifically, position information obtainer 91 is a GPS (Global Positioning System) module. In device control system 100, mobile terminal 90 is used to estimate the current position of the user.

Additionally, although not shown, mobile terminal 90 includes a communication module (communication circuit) for communicating with control device 10 and server apparatus 80, and transmits the position information obtained by position information obtainer 91 to communicator 11 included in control device 10.

[Operation of Changing Basic Screen]

Figure 8A:
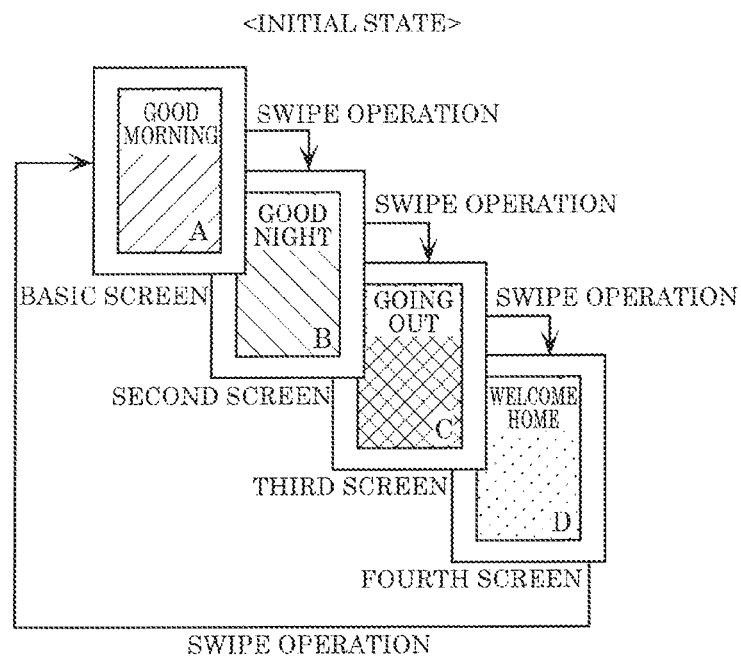
FIG. 8A is a first diagram for describing the outline of a changing operation of a basic screen.
Figure 8B:
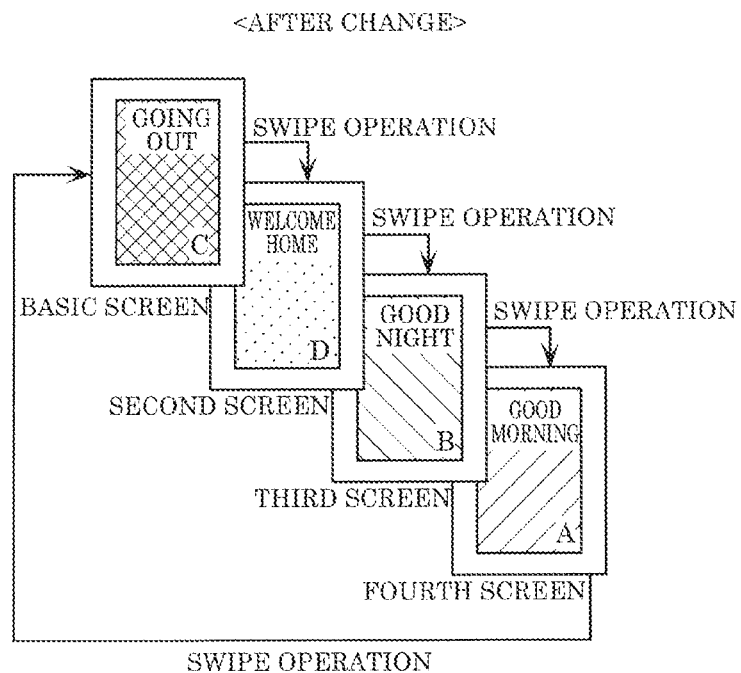
FIG. 8B is a second diagram for describing the outline of a changing operation of a basic screen.
Figure 9:
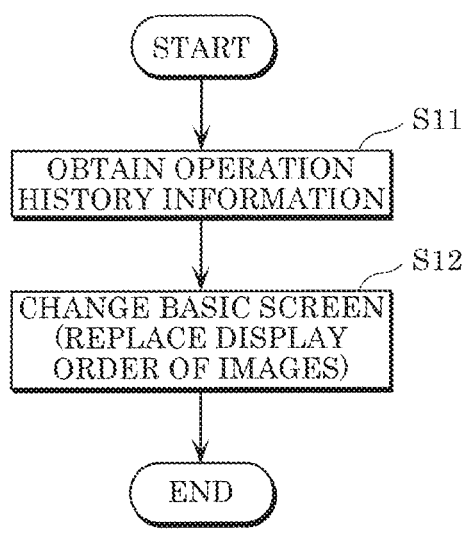
FIG. 9 is a flowchart of the changing operation of a basic screen.

Next, the operation of changing the basic screen performed by control device 10 will be described. FIG. 8A and FIG. 8B are diagrams for describing the outline of the changing operation of the basic screen. FIG. 9 is a flowchart of the changing operation of the basic screen.

In the operation described by using FIG. 8A, FIG. 8B, and FIG. 9, screen transitions are performed according to swipe operations by the user. Specifically, whenever a swipe operation is performed in a first direction (for example, the direction from the left toward the right), screen transitions are performed in the order of the basic screen, a second screen, a third screen, and a fourth screen.

Four kinds of images for scene control are used as candidates of these four screens. Specifically, the four kinds of images for scene control are an image A including a good morning icon, an image B including a good night icon, an image C including a going out icon, and an image D including a welcome home icon.

Specifically, the image A including the good morning icon is a form as shown in the above-described FIG. 5, and the image C including the going out icon is a form as shown in the above-described FIG. 6. Although not shown, the same also applies to the image B including the good night icon and the image D including the welcome home icon. Note that the image B including the good night icon is an image used mainly at the time when the user goes to sleep, and the image D including the welcome home icon is an image used mainly at the time when the user comes home.

In the initial state shown in FIG. 8A, the image A including the good morning icon is used as the basic screen. In other words, the basic screen is a first screen or a top screen. When a swipe operation in the first direction is detected by touch panel 15a while the basic screen is displayed, display 15b performs a transition to the second screen. In the initial state, the image B including the good night icon is used as the second screen.

Similarly, when a swipe operation along the first direction is detected by touch panel 15a while the second screen is displayed, display 15b performs a transition to the third screen. In the initial state, the image C including the going out icon is used as the third screen. Note that when a swipe operation along a second direction (for example, the direction from the right toward the left), which is opposite to the first direction, is detected by touch panel 15a while the second screen is displayed, display 15b performs a transition to the basic screen. Similarly, when a swipe operation along the first direction is detected by touch panel 15a while the third screen is displayed, display 15b performs a transition to the fourth screen. In the initial state, the image D including the welcome home icon is used as the fourth screen. Note that when a swipe operation along the second direction is detected by touch panel 15a while the third screen is displayed, display 15b performs a transition to the second screen. When a swipe operation along the first direction is detected by touch panel 15a while the fourth screen is displayed, display 15b performs a transition to the basic screen.

In such an initial state, display controller 12b obtains the operation to display 15b (touch panel 15a) by the user as operation history information (S11). The operation history information is an example of the first information obtained by control device 10, and is stored in storage 13. After a certain period has elapsed, display controller 12b changes the basic screen by replacing the display order of the above-described four images based on the operation history information (S12).

For example, suppose the number of times of tap operation performed on the going out icon> the number of times of tap operation performed on the welcome home icon> the number of times of tap operation performed on the good night icon> the number of times of tap operation performed on the good morning icon in the operation history information stored in storage 13. In this case, display controller 12b sequentially assigns the images including the icons having higher frequency of use to the basic screen, the second screen, the third screen, and the fourth screen. That is, as shown in FIG. 8B, display controller 12b uses the image C including the going out icon as the basic screen, uses the image D including the welcome home icon as the second screen, uses the image B including the good night icon as the third screen, and uses the image A including the good morning icon as the fourth screen.

In this manner, display controller 12b learns the frequency of use of the images (icons) by the user based on the operation history information. As a result of the learning, display controller 12b changes the image used as the basic screen to the image having the highest frequency of being operated. Similarly, display controller 12b changes the image used as the second screen, the third screen, and the fourth screen based on the operation history information. In other words, display controller 12b changes the display order of a plurality of images based on the operation history information.

Accordingly, control device 10 can reduce the number of times of swipe operation by the user. With the reduction of the number of times of operation, the amount of information processing, such as screen transition processing, performed by control device 10 is reduced.

Further, in the operation history information, the image including an icon having a low frequency of operation may be deleted by, for example, accepting a predetermined operation from the user by touch panel 15a. For example, in the example of FIG. 8B, the image A including the good morning icon may be deleted. In other words, the fourth screen may be deleted. As a result, according to the swipe operation by the user, either of the basic screen, the second screen, and the third screen is displayed on display 15b.

[Another Operation Example 1 of Changing Basic Screen]

The above-described operation history information may include information about the timing of operation, including at least one or more of the time, the date, the day of the week, and the season. For example, when an operation by the user to display 15b (touch panel 15a) is performed, display controller 12b stores the time information measured by timer 15d in storage 13 as the information about the timing of the operation. Accordingly, the information about the timing of the operation can be included in the operation history information.

Figure 10:
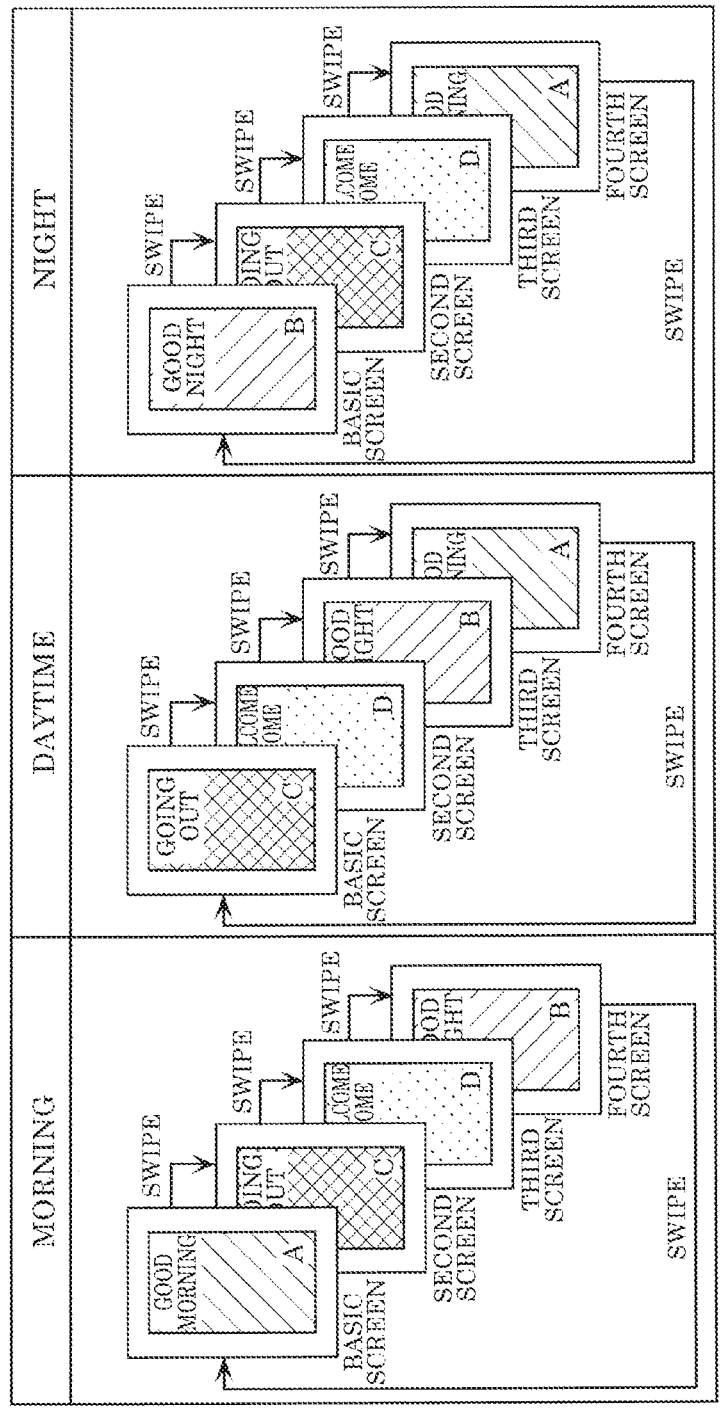
FIG. 10 is a diagram showing a different display order for each of time periods.

Display controller 12b may change the image used as the basic screen based on the operation history information including such information about the timing of operation. For example, display controller 12b divides one day into three time periods, i.e., morning (for example, 6:00 to 12:00), daytime (12:00 to 18:00), and night (18:00 to 24:00), and counts the number of times the icon is operated for each of the time periods. Then, when the current time belongs to the time period of morning, display controller 12b performs screen transitions in a first display order in which the images including the icons having higher frequency of use in the time period of morning are sequentially assigned with the basic screen, the second screen, the third screen, and the fourth screen. Similarly, when the current time belongs to the time period of daytime, display controller 12b performs screen transitions in a second display order in which the images including the icons having higher frequency of use in the time period of daytime are sequentially assigned with the basic screen, the second screen, the third screen, and the fourth screen, and when the current time belongs to the time period of night, display controller 12b performs screen transitions in a third display order in which the images including the icons having higher frequency of use in the time period of night are sequentially assigned with the basic screen, the second screen, the third screen, and the fourth screen. FIG. 10 is a diagram showing a different display order for each of the time periods.

In this manner, display controller 12b may perform screen transitions in a different display order for each of the time periods. That is, the image used by display controller 12b as the basic screen may be different for each of the time periods in which the basic screen is displayed.

Accordingly, control device 10 can reduce the number of times of swipe operation by the user. With the reduction of the number of times of operation, the amount of information processing, such as screen transition processing, performed by control device 10 is reduced.

Further, display controller 12b may count the number of times that the icon is operated for each day of the week, and may perform screen transitions in a different display order for each day of the week. That is, the image used as the basic screen may be different for each day of the week on which the basic screen is displayed. Additionally, display controller 12b may divide one year into four seasons, i.e., spring (for example, March to May), summer (June to August), autumn (September to November), and winter (December to February), may count the number of times the icon is operated for each of the seasons, and may perform screen transitions in a different display order for each of the seasons. That is, the image used as the basic screen may be different for each of the seasons in which the basic screen is displayed.

Figure 11:
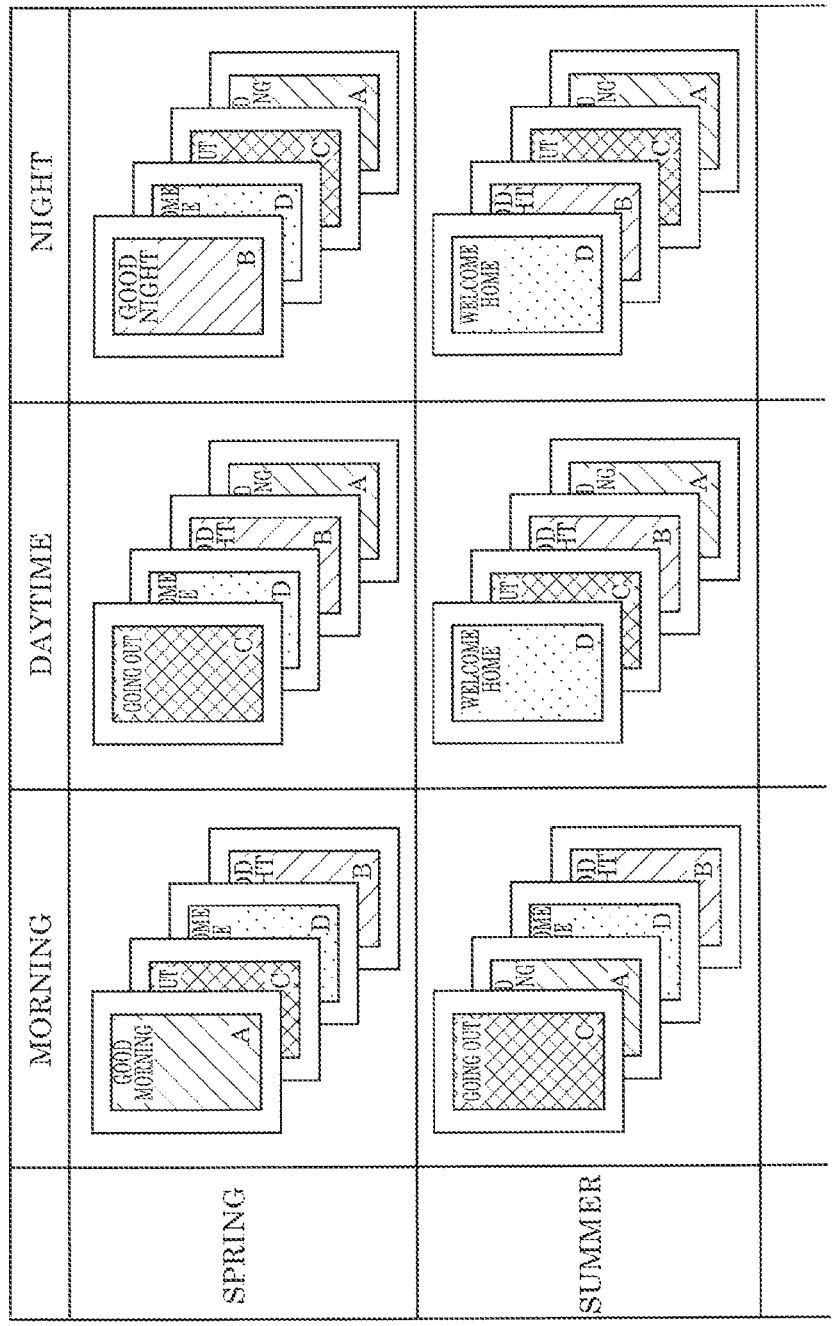
FIG. 11 is a diagram showing different display orders for each of time periods and seasons.

Additionally, display controller 12b may count the number of times the icon is operated by using two or more parameters, such as the time periods, the days of the week, and the seasons, and may perform screen transitions in different display orders. For example, as shown in FIG. 11, display controller 12b may perform screen transitions in a total of 12 kinds (only six kinds are shown in FIG. 11) of display order, which are different for each of the time periods (three kinds) and each of the seasons (four kinds). FIG. 11 is a diagram showing different display orders for each of the time periods and seasons.

Accordingly, control device 10 can reduce the number of times of swipe operation by the user. With the reduction of the number of times of operation, the amount of information processing, such as screen transition processing, performed by control device 10 is reduced.

[Another Operation Example 2 of Changing Basic Screen]

In addition to the operation history information, display controller 12b may change the image used as the basic screen based on fingerprint information of the user obtained by identification information obtainer 15c.

For example, display controller 12b stores in advance the fingerprint information of a user A, a user B, and a user C as registered fingerprint information in storage 13. Additionally, display controller 12b and controller 12a have a requirement for performing scene control that the user touches identification information obtainer 15c. Accordingly, display controller 12b can obtain the fingerprint information of the user, when the user operates the icons.

Display controller 12b can specify which of the user A, the user B, and the user C is the user who performed an operation, by comparing the obtained fingerprint information of the user and the registered fingerprint information stored in storage 13. Display controller 12b includes user specifying information, which indicates who is the user that performed the operation, in the operation history information.

Figure 12:
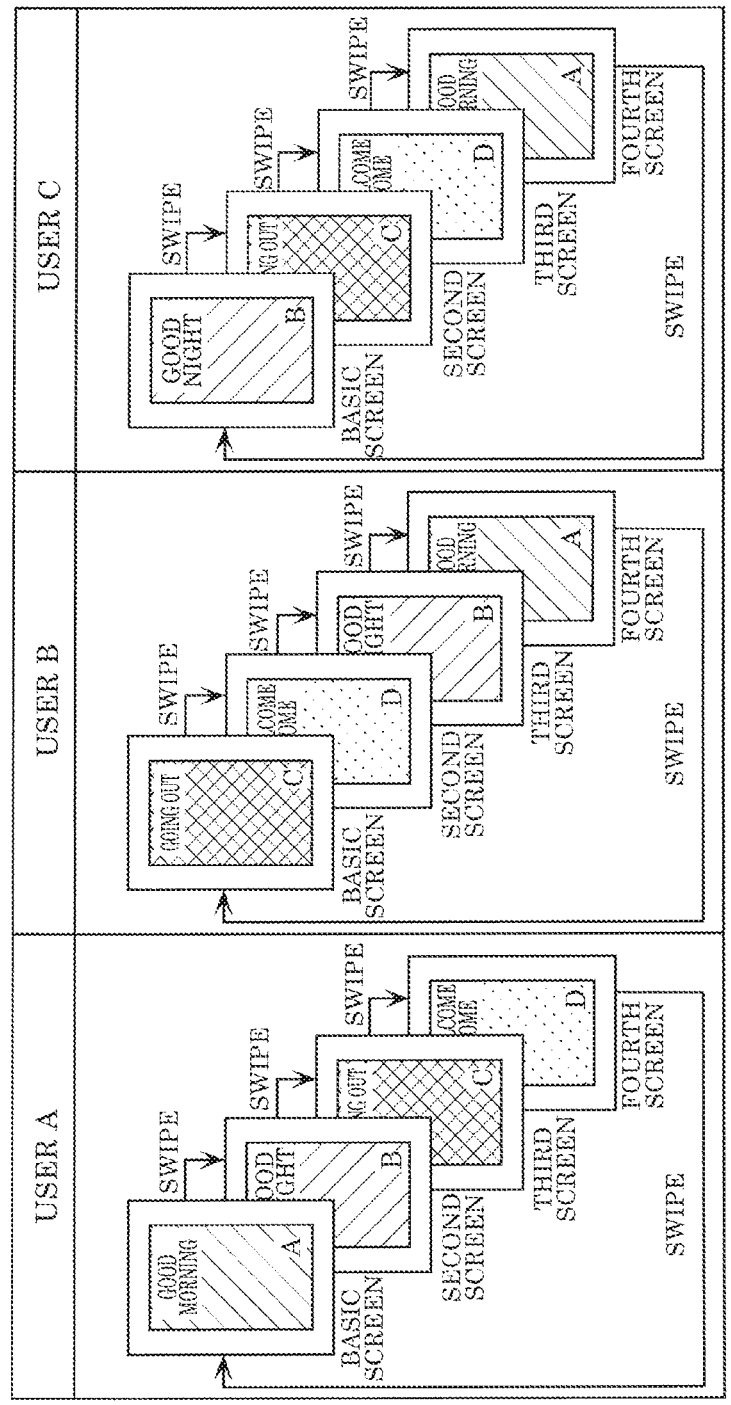
FIG. 12 is a diagram showing a different display order for each of the users.

Display controller 12b may change the image used as the basic screen based on the operation history information including such user specifying information. Display controller 12b counts, for example, the number of times the icon is operated for each user. Then, when user A touches identification information obtainer 15c while planning the scene control, display controller 12b performs screen transitions in the first display order in which the images including the icons having higher frequency of use by the user A are sequentially assigned with the basic screen, the second screen, the third screen, and the fourth screen. Similarly, when the user B touches identification information obtainer 15c while planning the scene control, display controller 12b performs screen transitions in the second display order in which the images including the icons having higher frequency of use by the user B are sequentially assigned with the basic screen, the second screen, the third screen, and the fourth screen. When the user C touches identification information obtainer 15c while planning the scene control, display controller 12b performs screen transitions in the third display order in which the images including the icons having higher frequency of use by the user C are sequentially assigned with the basic screen, the second screen, the third screen, and the fourth screen. FIG. 12 is a diagram showing a different display order for each of the users.

In this manner, display controller 12b may perform screen transitions in a different display order for each of the users. That is, the image used by display controller 12b as the basic screen may be different for each of the users.

Accordingly, control device 10 can reduce the number of times of swipe operation by the user. With the reduction of the number of times of operation, the amount of information processing, such as screen transition processing, performed by control device 10 is reduced.

[Another Operation Example 3 of Changing Basic Screen]

Display controller 12b may change the image used as the basic screen based on temperature information received by communicator 11 after being obtained by temperature and humidity measurer 31 included in air-conditioner 30, in addition to the operation history information.

Display controller 12b stores the temperature information measured by temperature and humidity measurer 31 in storage 13 when, for example, an operation to display 15b (touch panel 15a) is performed by the user. Accordingly, the temperature information at the time when the operation is performed can be included in the operation history information.

Display controller 12b may change the image used as the basic screen based on the operation history information including such temperature information. Display controller 12b divides the room temperature (temperature) into a plurality of temperature ranges, and counts the number of times the icon is operated for each of the temperature ranges. Then, when the current room temperature belongs to a first temperature range, display controller 12b performs screen transition in the first display order in which the images including the icons having higher frequency of use when the room temperature belongs to the first temperature range are sequentially assigned with the basic screen, the second screen, the third screen, and the fourth screen. Similarly, when the current room temperature belongs to a second temperature range different from the first temperature range, display controller 12b performs screen transition in the second display order in which the images including the icons having higher frequency of use when the room temperature belongs to the second temperature range are sequentially assigned with the basic screen, the second screen, the third screen, and the fourth screen.

In this manner, display controller 12b may perform screen transitions in a different display order for each of the temperature ranges to which the room temperature belongs. That is, the image used by display controller 12b as the basic screen may be different for each room temperature (temperature range) at the time when the basic screen is displayed.

Accordingly, control device 10 can reduce the number of times of swipe operation by the user. With the reduction of the number of times of operation, the amount of information processing, such as screen transition processing, performed by control device 10 is reduced.

Note that, although a detailed description is omitted, the humidity information may be used instead of the temperature information. That is, display controller 12b may change the image used as the basic screen based on the humidity information obtained by communicator 11 from temperature and humidity measurer 31 included in air-conditioner 30, in addition to the operation history information. The temperature information and the humidity information are examples of information indicating the environment condition around control device 10.

Modifications

In the above-described Embodiment 1, the image used as the basic screen is selected from the images for scene control. That is, display controller 12b changes the image used as the basic screen from the first image for instructing first control content to a first object device to the second image for instructing second control content, which is different from the first control content, to the first object device. The first object device is, for example, lighting apparatus 20, air-conditioner 30, electric curtain 40, etc.

However, display controller 12b may change the image used as the basic screen from the first image for controlling the first object device to the second image for controlling a second object device, which is different from the first object device. For example, display controller 12b may change the image used as the basic screen from an exclusive image for controlling air-conditioner 30 shown in the above-described FIG. 4 to an exclusive image (not shown) for controlling lighting apparatus 20, or to an exclusive image (not shown) for controlling electric curtain 40.

Additionally, in the above-described Embodiment 1, although the screen transitions are performed by swipe operations, the screen transitions may be performed according to operations other than the swipe operations. For example, an icon for screen transition may be included in an image, and a screen transition may be performed by a tap operation on the icon for screen transition. Additionally, control device 10 may include a hardware key (button) for screen transition, and screen transition may be performed by an operation to the hardware key. That is, screen transition may be performed based on operation to control device 10.

Additionally, in the above-described Embodiment 1, although one image including only one icon, which is the target of operation, is the image used as the basic screen, an image including a plurality of icons that are the targets of operation may be used as the basic screen. In this case, display controller 12b may change the arrangement of icons based on the operation history information. That is, the processing of changing the image used as the basic screen includes the processing of changing an image in which a plurality of icons are arranged in a first form to an image in which the plurality of icons are arranged in a second form.

Embodiment 2

[Operation Example 1 of Embodiment 2]

In Embodiment 1, the example has been described in which the image used as the basic screen is changed based on the operation history information obtained by control device 10. In Embodiment 2, an example will be described in which the image used as the basic screen is changed based on information different from the operation history information.

Figure 13:
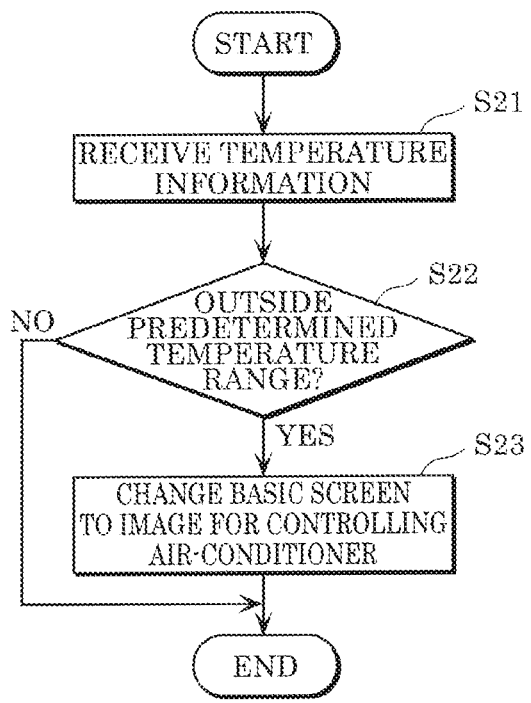
FIG. 13 is a flowchart of Operation Example 1 of Embodiment 2.

Further, in the following Embodiment 2, a description about the previously described matters will be appropriately omitted, and a description will be given mainly of differences from Embodiment 1. FIG. 13 is a flowchart of Operation Example 1 of Embodiment 2.

Operation Example 1 is an operation example in which the image used as the basic screen is changed based on the temperature information obtained by temperature and humidity measurer 31 included in air-conditioner 30. The temperature information obtained by temperature and humidity measurer 31 is an example of the second information obtained by a device other than control device 10.

First, communicator 11 receives the temperature information obtained by temperature and humidity measurer 31 included in air-conditioner 30 (S21). The temperature information may be obtained from a temperature measuring apparatus other than temperature and humidity measurer 31 included in air-conditioner 30. The temperature information may be obtained from, for example, a dedicated apparatus that measures the room temperature.

Next, display controller 12b determines whether or not the temperature indicated by the temperature information received by communicator 11 is outside a predetermined temperature range (S22). Specifically, display controller 12b determines whether or not the temperature indicated by the temperature information received by communicator 11 is equal to or more than a predetermined temperature (for example, 28° C. or more). Further, display controller 12b may determine whether or not the temperature indicated by the temperature information received by communicator 11 is less than the predetermined temperature (for example, less than 15° C.).

When the temperature indicated by the temperature information received by communicator 11 is outside a predetermined temperature range (28° C. or more or less than 15° C.) (Yes in S22), display controller 12b changes the image used as the basic screen to the image for controlling air-conditioner 30 (S23).

On the other hand, when the temperature indicated by the temperature information received by communicator 11 is in the predetermined temperature range (No in S22), the operation ends, and the change of the image used as the basic screen is not performed.

In this manner, in a case where it is estimated that it is necessary to control air-conditioner 30, when the image used as the basic screen is changed to the image for controlling air-conditioner 30, control device 10 can reduce the number of times of operation performed by the user to display the image for controlling air-conditioner 30. With the reduction of the number of times of operation, the amount of information processing performed by control device 10 is reduced.

Note that, although a detailed description is omitted, the humidity information may be used instead of the temperature information. That is, display controller 12b may change the image used as the basic screen based on the humidity information received by communicator 11. Each of the temperature information and the humidity information is an example of the information indicating the environment condition around control device 10, and is an example of the second information.

Additionally, when server apparatus 80 is a server apparatus that obtains and manages the weather forecast information, instead of the temperature information, temperature prediction information included in the weather forecast information may be used as the above-described second information. The weather forecast information or the temperature prediction information is an example of prediction information of the environment condition around control device 10, and is an example of the second information obtained by a device other than control device 10.

In this case, communicator 11 receives the temperature prediction information from server apparatus 80, and display controller 12b changes the image used as the basic screen based on the temperature prediction information received by communicator 11.

Additionally, display controller 12b may be a thermometer that measures the body temperature of the user, and may change the image used as the basic screen based on temperature information (body temperature information) obtained by the thermometer capable of wireless communication with communicator 11. The temperature information obtained by the thermometer is an example of the second information.

For example, when the obtained temperature information indicates a temperature of 38° C. or more, display controller 12b displays the image B including the good night icon. In this manner, in a case where it is estimated that the condition of the user is bad, when the image used as the basic screen is changed to the image B used mainly at the time when the user goes to sleep, control device 10 can reduce the number of times of operation performed by the user to display the image B. With the reduction of the number of times of operation, the amount of information processing performed by control device 10 is reduced.

[Operation Example 2 of Embodiment 2]

Figure 14:
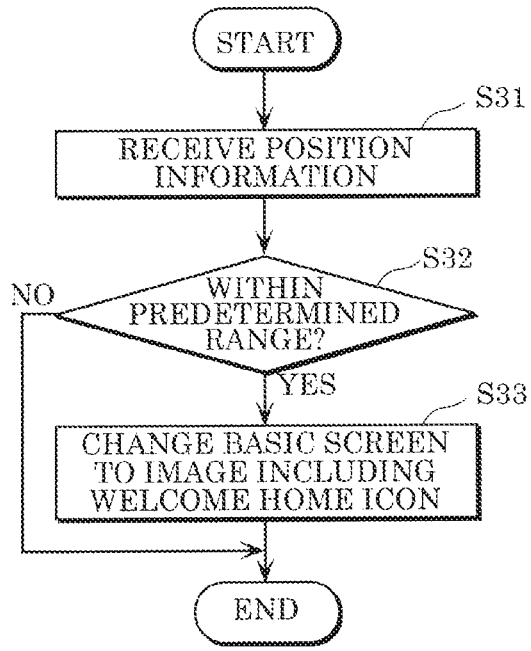
FIG. 14 is a flowchart of Operation Example 2 of Embodiment 2.

Next, as Operation Example 2 of Embodiment 2, a description will be given of an operation example in which the image used as the basic screen is changed based on position information obtained by position information obtainer 91 of mobile terminal 90. FIG. 14 is a flowchart of Operation Example 2 of Embodiment 2. The position information is an example of the second information obtained by a device other than control device 10.

First, communicator 11 receives the position information obtained by position information obtainer 91 of mobile terminal 90 from mobile terminal 90 (S31). Next, display controller 12b determines whether or not the position indicated by the position information received by communicator 11 is in a predetermined range centering on the position indicated by the position information of facility 101 (for example, within the range of 20 m) (S32). The position information of facility 101 is stored in storage 13 in advance, for example.

When the position indicated by the position information received by communicator 11 is in the above-described predetermined range of facility 101 (Yes in S32), display controller 12b changes the image used as the basic screen to the image D including the welcome home icon (S33).

On the other hand, when the position indicated by the position information received by communicator 11 is outside the above-described predetermined range (No in S32), the operation ends, and the change of the image used as the basic screen is not performed.

In this manner, in a case where it is estimated that the user will come home soon, when the image used as the basic screen is changed to the image D used mainly at the time when the user comes home, control device 10 can reduce the number of times of operation performed by the user to display the image D. With the reduction of the number of times of operation, the amount of information processing performed by control device 10 is reduced.

[Operation Example 3 of Embodiment 2]

Figure 15:
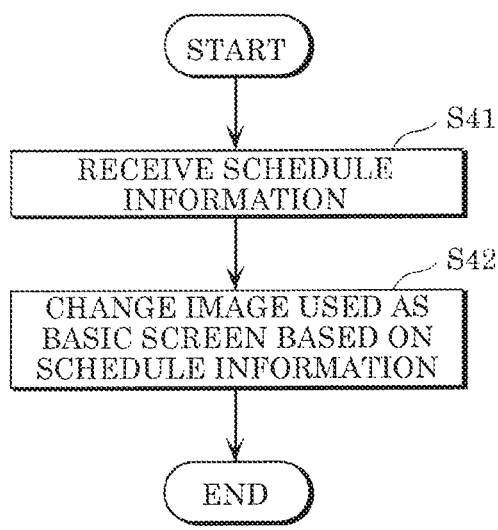
FIG. 15 is a flowchart of Operation Example 3 of Embodiment 2.

Next, as Operation Example 3 of Embodiment 2, a description will be given of an operation example in which the image used as the basic screen is changed based on schedule information obtained and managed by server apparatus 80. FIG. 15 is a flowchart of Operation Example 3 of Embodiment 2. Note that, different from Operation Example 2, in Operation Example 3, a description will be given by assuming that server apparatus 80 is a server apparatus that obtains and manages the schedule information. The schedule information is an example of the second information.

In Operation Example 3, the user registers in advance the schedule information of the user to server apparatus 80 via an SNS (Social Networking Service) or an email by operating mobile terminal 90. That is, the schedule information is obtained in advance by server apparatus 80.

Communicator 11 receives the schedule information of the user registered in advance in this manner from server apparatus 80 (S41). Note that the schedule information may be received from mobile terminal 90, or may be directly input to control device 10 via touch panel 15a.

Next, display controller 12b changes the image used as the basic screen based on the schedule information received by communicator 11 (S42).

For example, when the coming home schedule time is set in the schedule information received by communicator 11, display controller 12b determines whether or not the current time has reached the coming home schedule time by using timer 15d. When the current time reaches the coming home schedule time, display controller 12b changes the image used as the basic screen to the image D including the welcome home icon.

Additionally, when the holding schedule time of a party is set in the received schedule information for example, display controller 12b determines whether or not the current time has reached the holding schedule time by using timer

15*d*. When the current time has reached the holding schedule time, display controller 12*b* changes the image used as the basic screen to an image including an icon for performing the scene control for party. Further, in this case, control device 10 may prompt the user to perform an operation to the icon, by outputting a sound from a speaker (not shown).

In this manner, when the image used as the basic screen is changed based on the schedule information, control device 10 can reduce the number of times of operation performed by the user to display a target image. With the reduction of the number of times of operation, the amount of information processing performed by control device 10 is reduced.

Also, in addition to the schedule information, the weather forecast information described in Operation Example 2 may be used. In this case, communicator 11 receives the weather forecast information from, for example, another server apparatus that manages the weather forecast information, which is different from server apparatus 80 that manages the schedule information.

For example, when a going out schedule time is set in the received schedule information, display controller 12*b* usually determines whether or not the current time has reached the going out schedule time by using timer 15*d*, and when the current time has reached the going out schedule time, display controller 12*b* changes the image used as the basic screen to an image C including a going out icon.

Here, in the received weather forecast information, when the rainfall probability at the going out schedule time is equal to or more than a predetermined probability (for example, 60% or more), there is a possibility that the going out schedule time may be advanced. Therefore, in such a case, display controller 12*b* determines whether or not the current time has reached a first time, which is before the going out schedule time, by using timer 15*d*, and when the current time has reached the first time, display controller 12*b* changes the image used as the basic screen to the image C including the going out icon. The first time is a time that is ten minutes earlier than the going out schedule time, for example.

In this way, display controller 12*b* may advance the timing at which the image used as the basic screen is changed, based on the weather forecast information. Further, display controller 12*b* may delay the timing at which the image used as the basic screen is changed, based on the weather forecast information.

Accordingly, the change of the image used as the basic screen can be performed at a more appropriate timing.

Further, in addition to the schedule information, the traffic jam information or the delay information of public transportation facilities may be used. In this case, communicator 11 receives the traffic jam information or the delay information of public transportation facilities from, for example, another server apparatus that manages and obtains the traffic jam information or the delay information of public transportation facilities, which is different from server apparatus 80 that manages the schedule information. The traffic jam information and the delay information of public transportation facilities are examples of the second information.

For example, when the going out schedule time is set in the received schedule information, display controller 12*b* usually determines whether or not the current time has reached the going out schedule time by using timer 15*d*, and when the current time has reached the going out schedule time, display controller 12*b* changes the image used as the basic screen to the image C including the going out icon.

When it is estimated by the received traffic jam information or the delay information of public transportation facilities that the user leaves early, display controller 12*b* determines whether or not the current time has reached the first time, which is before the going home schedule time, by using timer 15*d*, and when the current time has reached the first time, display controller 12*b* changes the image used as the basic screen to the image C including the going out icon. The first time may be properly set according to, for example, the degree of traffic jam indicated by the traffic jam information, or the degree of delay indicated by the delay information of public transportation facilities.

In this manner, display controller 12*b* may advance the timing at which the image used as the basic screen is changed, based on the traffic jam information or the delay information of public transportation facilities.

[Operation Example 4 of Embodiment 2]

Figure 16:
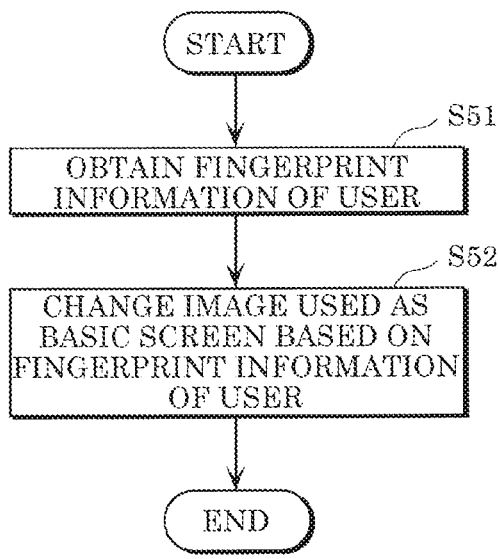
FIG. 16 is a flowchart of Operation Example 4 of Embodiment 2.

Next, as Operation Example 4 of Embodiment 2, a description will be given of an operation example in which the image used as the basic screen is changed based on fingerprint information of the user obtained by identification information obtainer 15*c*. FIG. 16 is a flowchart of Operation Example 4 of Embodiment 2. Note that the fingerprint information is an example of the identification information, and is an example of the first information.

In Operation Example 4, a plurality of users set in advance the image to be used as the basic screen when the users operate control device 10 by performing an operation to display 15*b* (touch panel 15*a*), and register in advance the fingerprint information of the users via identification information obtainer 15*c*. That is, the association information with which the fingerprint information is associated with the image used as the basic screen for each of the users is stored in advance in storage 13.

Identification information obtainer 15*c* obtains the fingerprint information of the user (S51). Next, display controller 12*b* changes the image used as the basic screen based on the obtained fingerprint information of the user (S52). Specifically, display controller 12*b* specifies the image associated with the user who has the obtained fingerprint information by referring to the association information stored in storage 13. Then, display controller 12*b* changes the image used as the basic screen to the specified image.

In this manner, when the image used as the basic screen is changed based on the fingerprint information of the user, control device 10 can reduce the number of times of operation performed by the user to display the target image. With the reduction of the number of times of operation, the amount of information processing performed by control device 10 is reduced.

Note that the fingerprint information is an example of the identification information. As described above, biometric information other than the fingerprint information, or an image of the user's face may be used as the identification information.

(Conclusion)

As described above, a display method according to the foregoing embodiments includes: based on at least one of first information obtained by control device 10 including display 15*b* and second information obtained by a device other than control device 10, changing an image used as a basic screen that is displayed on display 15*b* and is for controlling a control target device other than control device 10 by a user. Control device 10 is an example of an information terminal. A control target device is, for example, lighting apparatus 20, air-conditioner 30, or electric curtain 40, but is not limited to these.

Accordingly, the number of times of operation by the user to control a device is reduced by changing the basic screen to an appropriate image.

For example, in the changing, the image used as the basic screen is changed from a first image for controlling a first control target device to a second image for controlling a second control target device different from the first control target device. Alternatively, in the changing, the image used as the basic screen is changed from a first image for instructing first control content to the first control target device to a second image for instructing second control content different from the first control content to the first control target device.

Accordingly, the above-described display method can change the control target device or the control content by changing the image to be used as the basic screen.

For example, the first information is operation history information of the user to display 15b, and in the changing, the image used as the basic screen is changed based on the operation history information.

Accordingly, the number of times of operation by the user to control the device is reduced by changing the basic screen to an image with a high operation frequency, i.e., an image with a high possibility of being used.

Furthermore, for example, the operation history information includes information about timing of the operation, including at least one of time, date, day of week, and season.

Accordingly, the number of times of operation by the user to control the device is reduced by changing the basic screen to an image with a high operation frequency.

For example, the display method further includes: performing a screen transition from the basic screen to an other screen, based on an operation by the user to control device 10, and changing the image used as the other screen, based on at least one of the first information and the second information. Specifically, the image used as the second screen in the foregoing embodiments is changed.

Accordingly, the number of times of operation by the user to control the device is reduced by changing another screen to an appropriate image.

For example, the display method further includes: sequentially displaying, on display 15b, a plurality of images that are targets of operation by the user, based on an operation by the user to control device 10, and changing a display order of the plurality of images based on at least one of the first information and the second information.

Accordingly, the number of times of operation by the user to control the device is reduced by displaying a plurality of images in an appropriate display order.

For example, the basic screen is a screen that is displayed on display 15b: when display 15b of control device 10 is not operated for a predetermined period; when display 15b of control device 10 is operated after not being operated for the predetermined period; or when a reset operation of control device 10 is performed.

Accordingly, in the above-described display method, when display 15b of control device 10 has not been operated for a predetermined period, when display 15b of control device 10 is operated after not having been operated for a predetermined period, or when a reset operation is performed on control device 10, the image that is displayed on display 15b and is used as the basic screen is changed, whereby the number of times of the operation by the user to display 15b is reduced.

For example, the first information includes identification information of the user, and, in the changing, the image used as the basic screen is changed based on the identification information of the user. The identification information of the user is, for example, fingerprint information of the user.

Accordingly, the above-described display method can change the basic screen for each user.

For example, the second information includes at least one of information indicating an environment condition around control device 10, and prediction information of the environment condition around control device 10. In the changing, the image used as the basic screen is changed based on at least one of the information indicating the environment condition around control device 10 and the prediction information of the environment condition around control device 10. The information indicating an environment condition around control device 10 is, for example, temperature information or humidity information. The prediction information of the environment condition around control device 10 is, for example, weather forecast information.

Accordingly, the above-described display method can change the image used as the basic screen to an image considered to have a high possibility of being used based on the information indicating the environment condition around control device 10, or the prediction information of the environment condition around control device 10.

For example, the second information includes position information of the device other than control device 10, and, in the changing, the image used as the basic screen is changed based on the position information of the device other than control device 10. The device other than control device 10 is, for example, mobile terminal 90.

Accordingly, the above-described display method can change the image used as the basic screen to an image considered to have a high possibility of being used based on the position information.

For example, the second information includes schedule information of the user, and, in the changing, the image used as the basic screen is changed based on the schedule information of the user.

Accordingly, the above-described display method can change the image used as the basic screen to an image considered to have a high possibility of being used based on the schedule information.

Furthermore, for example, control device 10: is disposed in wall 103 included in facility 101; and further includes a power receiver that receives electric power supplied for a power switch of a device disposed in facility 101. Wall 103 is an example of a structure.

Accordingly, the above-described display method can change the image used as the basic screen which is displayed on display 15b of control device 10 that is operated using the electric power supplied for the power switch.

Furthermore, for example, control device 10 further includes a switch element that switches between supplying and not supplying power to the device disposed in facility 101.

Accordingly, the above-described display method can change the image used as the basic screen which is displayed on display 15b of control device 10 that functions as a power switch.

Furthermore, for example, the present invention may be realized as a non-transitory computer-readable recording medium having recorded thereon a program for causing a computer to execute the above-described display method.

Accordingly, the number of times of operation by the user to control the device is reduced by changing the basic screen to an appropriate image.

Furthermore, device control system 100 includes: control device 10 including display 15b; and display controller 12b that, based on at least one of first information obtained by control device 10 and second information obtained by a device other than control device 10, changes an image used as a basic screen that is displayed on display 15b and is for controlling a control target device other than control device 10 by a user. Device control system 10 is an example of a display system.

Accordingly, the number of times of operation by the user to control the device is reduced by changing the basic screen to an appropriate image.

It should be noted that device control system 100 may be implemented as a single device or may be implemented as a plurality of devices. When device control system 100 is implemented as a plurality of devices, the elements included in device control system 100 described in the foregoing embodiments may be allocated as the plurality of devices in any manner.

For example, device control system 100 may be realized as a client/server system. For example, server apparatus 80 may include the function of display controller 12b, and control device 10 may function as an apparatus (a display apparatus and a user interface apparatus) that is passively operated based on the signal transmitted from server apparatus 80. In this case, display 15b included in control device 10 displays the basic screen based on the signal transmitted from server apparatus 80. Display 15b changes the image that is displayed on display 15b included in control device 10, and that is used as the basic screen by the user to control the control target device other than control device 10, based on at least one of the first information obtained by control device 10 and the second information obtained by the device other than control device 10.

Other Embodiments

In the above, although the embodiments have been described, the present invention is not limited to the above-described embodiments.

The communication method between the apparatuses described in the above-described embodiments is an example. The communication method between the apparatuses is not particularly limited. Wireless communication using telecommunications standards, such as specific low power radio, ZigBee®, Bluetooth®, or Wi-Fi®, is performed between apparatuses. Further, specifically, wireless communication is electric wave communication, or infrared ray communication.

Additionally, instead of wireless communication, wired communication, such as powerline communication (PLC) or communication using a cable LAN, may be performed between apparatuses.

Furthermore, for example, in the foregoing embodiments, a process executed by a particular processing unit may be executed by another processing unit. Furthermore, the order of processes may be changed, or processes may be executed in parallel.

Furthermore, in the foregoing embodiments, each of the elements may be configured using dedicated hardware, or may be implemented by executing a software program suitable for the element. Each of the elements may be implemented by means of a program executer, such as a CPU or a processor, reading and executing the software program recorded on a recording medium such as a hard disk or a semiconductor memory.

Furthermore, each of the elements may be a circuit (or an integrated circuit). These circuits as a whole may compose a single circuit or may be individual circuits. Moreover, each of the structural components may be implemented by a general-purpose processor or a dedicated processor.

Furthermore, the general or specific aspects of the present invention may be implemented as a system, an apparatus, a method, an integrated circuit, a computer program, or a computer-readable recording medium such as a CD-ROM, or may be implemented as any combination of a system, an apparatus, a method, an integrated circuit, a computer program, and a recording medium. For example, the present invention may be implemented as the control device (information terminal) according to the foregoing embodiments.

Furthermore, in the foregoing embodiments, the order of processes in the operation of the device control system described in the foregoing embodiments is an example. The order of the processes may be changed, or processes may be executed in parallel.

Forms obtained by making various modifications to the above embodiments that can be conceived by those skilled in the art, as well as forms obtained by combining elements and functions in respective embodiments, without materially departing from the spirit of the present invention are included in the present invention.

REFERENCE MARKS IN THE DRAWINGS 10 control device (information terminal)
12b display controller
15b display
100 device control system (display system)

The invention claimed is:

1. A display method, comprising:
based on first information obtained by an information terminal including a display, changing an image used as a basic screen that is displayed on the display and is for controlling, by a user, a plurality of control target devices other than the information terminal,
wherein the first information is operation history information of the user to the display,
the changing the image used as the basic screen comprises selecting an image from a plurality of images according to a time period to which a current time belongs,
each image of the plurality of images includes only one icon for collectively controlling all the plurality of control target devices by the user touching the only one icon only once, and
a total number of times of operation necessary to perform a transition from the basic screen to any of the plurality of images when only one of the plurality of images is displayed on the display is changed based on (i) frequencies of use in past of a plurality of kinds of collective controls associated with the plurality of images, and (ii) time periods in which the plurality of kinds of collective controls were performed in the past, the time periods each being included in a day,
the display method further comprises performing a screen transition from the basic screen selected to an other screen, based on an operation by the user to the information terminal, and
the other screen includes only one icon for collectively controlling, among a plurality of kinds of controls, a control having a second highest frequency of use in the time period to which the current time belongs, by the user touching the only one icon included in the other screen only once.

2. The display method according to claim 1, wherein
in the changing, the image used as the basic screen is changed (a) from a first image for controlling a first control target device to a second image for controlling a second control target device different from the first control target device, or (b) from a first image for instructing first control content to the first control target device to a second image for instructing second control content different from the first control content to the first control target device.

3. The display method according to claim 1, wherein
the operation history information includes information about timing of the operation, including at least one of time, date, day of week, and season.

4. The display method according to claim 1, further comprising:
changing the image used as the other screen, based on the first information.

5. The display method according to claim 1, further comprising:
sequentially displaying, on the display, a plurality of images that are targets of operation by the user, based on an operation by the user to the information terminal, and
changing a display order of the plurality of images based on the first information.

6. The display method according to claim 1, wherein
the basic screen is a screen that is displayed on the display: after the display of the information terminal is not operated for a predetermined period; after the display of the information terminal is operated after not being operated for the predetermined period; or after a reset operation of the information terminal is performed.

7. The display method according to claim 1, wherein
the first information includes identification information of the user, and
in the changing, the image used as the basic screen is changed based on the identification information of the user.

8. The display method according to claim 1, wherein:
the changing the image used as the basic screen is further based on second information obtained by a device other than the information terminal,
the second information includes at least one of information indicating an environment condition around the information terminal, and prediction information of the environment condition around the information terminal, and
in the changing, the image used as the basic screen is changed based on at least one of the information indicating the environment condition around the information terminal and the prediction information of the environment condition around the information terminal.

9. The display method according to claim 1, wherein:
the changing the image used as the basic screen is further based on second information obtained by a device other than the information terminal,
the second information includes position information of the device other than the information terminal, and
in the changing, the image used as the basic screen is changed based on the position information of the device other than the information terminal.

10. The display method according to claim 1, wherein:
the changing the image used as the basic screen is further based on second information obtained by a device other than the information terminal,
the second information includes schedule information of the user, and
in the changing, the image used as the basic screen is changed based on the schedule information of the user.

11. The display method according to claim 1, wherein
the information terminal:
is disposed in a structure included in a facility; and
further includes a power receiver that receives electric power supplied for a power switch of a device disposed in the facility.

12. The display method according to claim 11, wherein
the information terminal further includes a switch element that switches between supplying and not supplying power to the device disposed in the facility.

13. A non-transitory computer-readable recording medium having recorded thereon a program for causing a computer to execute the display method according to claim 1.

14. A display system, comprising:
an information terminal including a display; and
a display controller that, based on first information obtained by the information terminal, is configured to changes an image used as a basic screen that is displayed on the display and is for controlling, by a user, a plurality of control target devices other than the information terminal, wherein:
the first information is operation history information of the user to the display,
the changing the image used as the basic screen comprises selecting an image from a plurality of images according to a time period to which a current time belongs,
each image of the plurality of images includes only one icon for collectively controlling all the plurality of control target devices by the user touching the only one icon only once,
a total number of times of operation necessary to perform a transition from the basic screen to any of the plurality of images when only one of the plurality of images is displayed on the display is changed based on (i) frequencies of use in past of a plurality of kinds of collective controls associated with the plurality of images, and (ii) time periods in which the plurality of kinds of collective controls were performed in the past, the time periods each being included in a day,
the display controller further performs a screen transition from the basic screen selected to an other screen, based on an operation by the user to the information terminal, and
the other screen includes only one icon for collectively controlling, among a plurality of kinds of controls, a control having a second highest frequency of use in the time period to which the current time belongs, by the user touching the only one icon included in the other screen only once.

15. The display method according to claim 1,
wherein the screen transition from the basic screen selected to the other screen is performed by the user performing a swipe operation only once.

* * * * *